June 8, 1948. E. R. WARNER 2,442,790
METHOD FOR IDENTIFYING CROSS-WIRES IN OPTICAL INSTRUMENT
RETICULES BY THE USE OF POLARIZED LIGHT
Filed Aug. 13, 1945
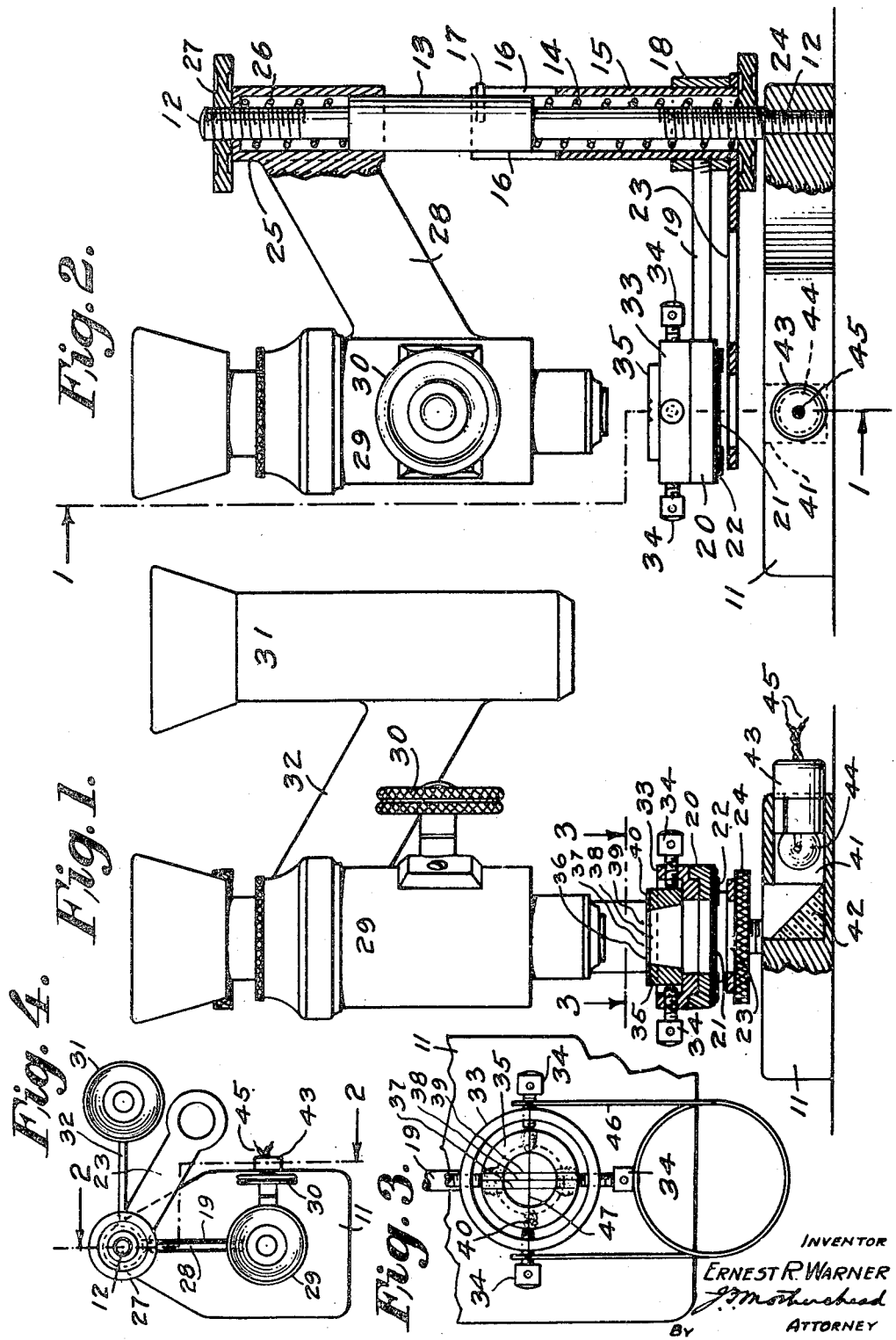
INVENTOR
ERNEST R. WARNER
BY J. J. Motherhead
ATTORNEY Patented June 8, 1948

2,442,790

UNITED STATES PATENT OFFICE 2,442,790

METHOD FOR IDENTIFYING CROSS WIRES IN OPTICAL INSTRUMENT RETICULES BY THE USE OF POLARIZED LIGHT

Ernest Ray Warner, Alexandria, Va., assignor to United States of America as represented by the Secretary of Interior Application August 13, 1945, Serial No. 610,659

1 Claim. (Cl. 88—14)

(Granted under the act of March 3, 1883, as amended April 30, 1928; 370 O. G. 757)

The invention described herein may be manufactured and used by or for the Government of the United States for governmental purposes without the payment to me of any royalty thereon in accordance with the provisions of the act of April 30, 1928 (Ch. 460, 45 Stat. L. 467).

My invention relates to a "Method and apparatus for identifying and installing cross wires in reticules of optical instruments." It is particularly useful in determining whether one or more cross wires in a reticule is made of platinum, glass or spider-web without damaging either the reticule or the cross-wire. A fire test would destroy a spider-web and might cause a glass cross-wire to break or to be permanently deformed.

Prior to my invention such cross-wires appeared substantially identical when installed in an optical instrument to fix a center line of sight or for measuring distances by "stadia" readings with a surveying instrument. Of the three materials mentioned, spider-web cross-wires are the cheapest, as well as the easiest to install, but become elongated and therefore are seriously defective whenever there is a material increase in humidity of the atmosphere. My method and apparatus for testing without damage either to the cross-wires or to the reticule itself, makes possible the testing of new reticules to determine whether or not the materials used for cross-wires comply with contract specifications.

My apparatus also serves as a means for accurately placing the wires in the very fine V-shaped graduations of the reticules and holding them in accurate adjustment while being firmly cemented in these graduations.

In the accompanying drawings:

Figure 1 is a front elevation of my device partly in section taken on the line 1—1 of Fig. 2.

Figure 2 is a section on the line 2—2 of Fig. 4.

Figure 3 is a fragmentary plan view on the line 3—3 of Fig. 1.

Figure 4 is a plan view on a reduced scale.

In these drawings:

A suitable supporting base 11 is provided with a threaded socket for a terminally threaded post 12 having a shouldered central enlargement 13. A compression spring 14 surrounds the lower portion of the post 12 and is enclosed by a sleeve 15 which has one or more slots 16 for a pin 17 mounted in the enlargement 13. Revolubly mounted on the sleeve 15 is a second sleeve 18 which supports a horizontal arm 19 having a terminal cup-shaped supporting ring 20, the bore of which is closed by a disk 21 of light polarizing material, held in position against the ring 20 by clips 22. An alternate support 23 is fixed to the sleeve 18 and moves with it beneath the arm 19 and ring 20. A thumb nut 24 permits varying the vertical position of the sleeve 18 and support 23 as well as the release of the sleeve 15 from the post 12 by lowering the sleeve 15 until the pin 17 is disengaged.

A supporting bracket 25 is adjustably supported over the upper portion of the post 12 by a compression spring 26 and thumb nut 27, and is provided with an arm 28 for supporting a high power microscope 29 which may be raised or lowered by a knurled thumb-screw 30 mounted in the arm 28 and with a second arm 32 supporting a low power microscope 31. A reticule holding ring 33 fits in the supporting ring 20, is free to be rotated therein and is provided with a plurality of radially mounted screws 34 for clamping a reticule 35 of an optical instrument provided with a plurality of cross-wires 36, 37, 38, 39, set in precisely located V-shaped graduations 40. The base 11 is provided with an L-shaped passage 41 in which there is set a 45-degree reflecting prism 42 at the angle of the passage. A socket 43 for an electric light bulb 44 is removably mounted in the passage 41 and is supplied with low voltage electric current through suitable supply wires 45.

For holding a cross-wire under tension while replacing a broken wire in a reticule, I have provided a device 46 (see Fig. 3) made of light spring wire having a central open coiled loop and two outwardly extending free ends. A new wire 47 is cemented or otherwise temporarily fastened to these free ends.

For determining whether an installed cross-wire is made of platinum, glass or spider-web, a reticule 35 with the cross-wires uppermost is supported as shown in Figure 1 and the bulb 44 is lighted. The reflected light is polarized by passing upwardly through the disk of light polarizing material 21 and is projected upon the cross-wires while the reticule is turned as an observer watches the wires through one of the microscopes. The platinum wires appear as single fine lines, regardless of the orientation of the plane of polarization. Glass filaments are strongly visible when properly oriented and have the appearance of a solid line, while spider-webs become translucent when properly oriented. This orientation is produced by manually turning the reticule holder while a reticule is clamped therein.

My instrument also serves for installing platinum cross-wires or the like in correct positions in reticules, a very exacting operation even with the best facilities. With this instrument other instrument repairers have succeeded in correctly installing platinum cross-wires who could not do so with the facilities which were previously available.

The method used comprises mounting a platinum wire 47 on the free ends of my device 46 and while keeping the wire under tension by regulating the pressure on the open coiled spring portion of my device, aligning the wire with a selected graduation of a reticule (see Fig. 3) with the aid of the low power microscope 31, then by rotating the microscopes ninety degrees bringing the high power microscope 29 over the wire to aid in fixing the wire permanently in the center of the V-shaped graduations 48 which are intentionally magnified in Figure 1 for the purpose of illustration. The wire is then permanently cemented in the graduations and the wire holding device is detached. The thumb nut 27 serves as a means for simultaneously raising or lowering both telescopes with respect to the reticule. The thumb nut 24 similarly serves to vary the distance between the supporting base 11 and the reticule as well as for releasing the support 23 and sleeve 15 from the pin 17.

I have shown and described one embodiment of my invention, but it is to be understood that it is capable of many modifications. Changes, therefore, in the construction and arrangement may be made without departing from the spirit and scope of the invention as disclosed in the appended claim.

What I claim is:

A method of optically identifying the material of installed cross wires of reticules for optical instruments which comprises observing the optical effect on a beam of polarized light directed upon said cross wires while turning said reticule to change the orientation of said wires with respect to the plane of polarization of the light beam, whereby through the optical effect on the polarized light beam, the material of the cross wires may be identified by observation through a microscope.

ERNEST RAY WARNER.

REFERENCES CITED

The following references are of record in the file of this patent:

UNITED STATES PATENTS

| Number | Name | Date |
|---|---|---|
| 1,971,061 | Bauersfeld | Aug. 21, 1934 |
| 2,255,631 | Schulman | Sept. 9, 1941 |
| 2,375,399 | Wittig | May 8, 1945 |